US011817542B2

(12) United States Patent
Wang

(10) Patent No.: US 11,817,542 B2
(45) Date of Patent: Nov. 14, 2023

(54) END PLATE POSITIONING APPARATUS AND BATTERY MODULE ASSEMBLING EQUIPMENT

(71) Applicant: CONTEMPORARY AMPEREX TECHNOLOGY CO., LIMITED, Ningde (CN)

(72) Inventor: Wenchong Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/096,131

(22) Filed: Jan. 12, 2023

(65) Prior Publication Data
US 2023/0170517 A1    Jun. 1, 2023

Related U.S. Application Data

(63) Continuation of application No. PCT/CN2022/082696, filed on Mar. 24, 2022.

(30) Foreign Application Priority Data

May 7, 2021    (CN) .................. 202120963358.X

(51) Int. Cl.
*H01M 10/04* (2006.01)
*H01M 50/264* (2021.01)

(52) U.S. Cl.
CPC ..... *H01M 10/0404* (2013.01); *H01M 50/264* (2021.01)

(58) Field of Classification Search
CPC .................. H01M 10/0404; H01M 50/264
See application file for complete search history.

(56) References Cited

FOREIGN PATENT DOCUMENTS

| CN | 105514477 A | * | 4/2016 |
| CN | 208507849 U | | 2/2019 |
| CN | 208560783 U | | 3/2019 |
| CN | 209078181 U | | 7/2019 |
| CN | 210984863 U | | 7/2020 |

(Continued)

OTHER PUBLICATIONS

ISR for International Application PCT/CN2022/082696 dated Jun. 8, 2022.

(Continued)

*Primary Examiner* — Jimmy Vo
(74) *Attorney, Agent, or Firm* — Ladas & Parry LLP

(57) ABSTRACT

Embodiments of this application provide an end plate positioning apparatus and battery module assembling equipment. The end plate positioning apparatus includes: a pedestal; a supporting piece, disposed on the pedestal and configured to hold an end plate; at least one first positioning mechanism, including a first positioning piece and a positioning locking piece, where the first positioning piece is rotatably connected to the pedestal, the positioning locking piece includes a guide portion and a slide portion, one of the guide portion or the slide portion is disposed on the first positioning piece, and the other is disposed on the pedestal; the guide portion includes a first position and a second position, and the slide portion is able to move between the first position and the second position to drive the first positioning piece to rotate.

11 Claims, 6 Drawing Sheets

(56) References Cited

FOREIGN PATENT DOCUMENTS

| | | |
|---|---|---|
| CN | 112310462 A | 2/2021 |
| CN | 112658567 A | 4/2021 |
| CN | 215299317 U | 12/2021 |
| JP | 2002343324 A | 11/2002 |

OTHER PUBLICATIONS

Written Opinion for International Application PCT/CN2022/082696 dated Jun. 8, 2022.

\* cited by examiner

END PLATE POSITIONING APPARATUS AND BATTERY MODULE ASSEMBLING EQUIPMENT

CROSS-REFERENCE TO RELATED APPLICATIONS

This application is a continuation of PCT/CN2022082696 filed on Mar. 24, 2022 which claims priority to Chinese Patent Application No. 202120963358.X, filed on May 7, 2021 and entitled "END PLATE POSITIONING APPARATUS AND BATTERY MODULE ASSEMBLING EQUIPMENT". Both applications are incorporated herein by reference in its entirety.

TECHNICAL FIELD

This application relates to the technical field of batteries, and in particular, to an end plate positioning apparatus and battery module assembling equipment.

BACKGROUND

Battery cells are widely used in electronic devices such as a mobile phone, a notebook computer, an electric power cart, an electric vehicle, an electric airplane, an electric ship, an electric toy car, an electric toy ship, an electric toy airplane, and a power tool. The battery cells may include a nickel-cadmium battery cell, a nickel-hydrogen battery cell, a lithium-ion battery cell, a secondary alkaline zinc-manganese battery cell, and the like.

When a plurality of battery cells are used in groups, the plurality of battery cells are assembled together to form a battery module. How to improve the assembling process of battery modules has always been a research topic in the industry.

SUMMARY

This application provides an end plate positioning apparatus and battery module assembling equipment to improve precision of assembling battery modules.

According to one aspect, an embodiment of this application provides an end plate positioning apparatus, applicable to assembling of battery modules. The end plate positioning apparatus includes: a pedestal; a supporting piece, disposed on the pedestal and configured to hold an end plate; at least one first positioning mechanism, including a first positioning piece and a positioning locking piece, where the first positioning piece is rotatably connected to the pedestal, the positioning locking piece includes a guide portion and a slide portion, one of the guide portion or the slide portion is disposed on the first positioning piece, and the other is disposed on the pedestal the guide portion includes a first position and a second position, and the slide portion is able to move between the first position and the second position to drive the first positioning piece to rotate; when the slide portion is located in the first position, the first positioning piece is in abutment with the end plate, so that the first positioning piece and the supporting piece clamp the end plate from both sides; and, when the slide portion is located in the second position, the first positioning piece is out of abutment with the end plate.

In the foregoing solution, the design of the first positioning mechanism can convert rotation into a movement in the third direction to implement positioning of the end plate, without occupying much space in the vertical third direction.

In this way, the end plate positioning apparatus achieves the purpose of positioning the end plate in the limited space of the battery module assembling equipment, and implements positioning of the end plate in a height direction by fully utilizing the limited space in the vertical third direction, thereby avoiding the problem that the end plate is prone to be out of position in the height direction due to a considerable length of the placed end plate, and improving the positioning precision of the end plate.

According to an aspect of embodiments of this application, the first positioning piece includes a connecting rod and a hold-down bar. One end of the connecting rod is rotatably connected to the pedestal, and the other end is connected to the hold-down bar. The slide portion is connected to the connecting rod. The guide portion is movably connected to the pedestal. The guide portion is able to move relative to the pedestal along a first direction so that, when the slide portion is located in the first position, a length direction of the connecting rod is parallel to the first direction, the hold-down bar is in abutment with the end plate along a second direction, and the first direction intersects the second direction, and so that, when the slide portion is located in the second position, the length direction of the connecting rod is at a preset angle to the first direction.

In the foregoing solution, as long as the slide portion is controlled to change over between the first position and the second position, the end plate can be automatically brought into position and out of position at a relatively high precision, thereby reducing the positioning error caused by repeated changeover.

According to an aspect of this application, the guide portion includes a guide slot. The slide portion includes a bulge extending into the guide slot. The bulge is slidably connected to the guide slot.

In the foregoing solution, a simple structural fit facilitates the changeover of the slide portion between the first position and the second position, thereby facilitating assembling. In addition, the fit between the bulge and the guide slot provides a guiding effect for the rotation of the connecting rod relative to the pedestal, thereby ensuring proper positioning of the end plate in the height direction.

According to an aspect of embodiments of this application, the guide slot includes at least a first hole and a second hole that communicate with each other. A connecting line of an axis of the first hole and an axis of the second hole is at a preset angle to the first direction. The length direction of the connecting rod is parallel to the first direction when the bulge is located in the first hole, and the length direction of the connecting rod is at the preset angle to the first direction when the bulge slides to the second hole.

In the foregoing solution, the preset angle by which the connecting rod is rotated can be adjusted through the fit between the bulge and the first hole or second hole, and the connecting rod can be controlled at a relatively high precision to rotate by an angle that changes over between an initial 0-degree angle and the preset angle, so as to ensure that the hold-down bar can implement efficient and quick positioning in the height direction on each occasion of positioning the end plate.

According to an aspect of embodiments of this application, the first hole and the second hole are through-holes, or, the first hole and the second hole are blind holes.

In the foregoing solution, the stability of the movement of the bulge in the guide slot is ensured, thereby improving the stability of positioning the end plate in the third direction.

According to an aspect of this application, the positioning locking piece further includes a first driving portion. The first driving portion is connected to the pedestal and is configured to drive the guide portion to move along the first direction.

In the foregoing solution, the movement in the first direction is converted into a desired movement in the second direction by the fit between the first driving portion, the slide portion, and the guide portion that are disposed, thereby implementing stable positioning of the end plate at a high precision on the basis of reducing the occupation of space in the second direction.

According to an aspect of embodiments of this application, the end plate positioning apparatus further includes a second positioning mechanism. The second positioning mechanism includes: a suction cup, movably connected to a side of the pedestal toward the end plate, where the suction cup contains an suction end face configured to attract the end plate; and a second driving portion, connected to the pedestal, and configured to drive the suction cup to draw the end plate to approach or move away from the pedestal.

In the foregoing solution, the second positioning mechanism disposed can draw the end plate into position before an robotic arm gives up grabbing the end plate, and prevent the end plate from tipping over before the first positioning mechanism starts to function.

According to an aspect of embodiments of this application, the pedestal contains a first sidewall. The supporting piece is detachably connected to the first sidewall. An abutting piece is disposed above the supporting piece on the first sidewall. The end plate is in contact and fit with the abutting piece when the suction cup draws the end plate to approach the pedestal.

In the foregoing solution, the end plate is not only positioned in the first direction by the second positioning mechanism, but also moved to a position from which the second positioning mechanism can implement positioning of the end plate, thereby avoiding the collision caused by direct placement of the end plate into this position, and improving the stability and precision of positioning.

According to an aspect of embodiments of this application, the end plate positioning apparatus further includes a third positioning mechanism. The third positioning mechanism is able to move relative to the pedestal along the first direction. The third positioning mechanism includes: a mounting portion, movably connected to the pedestal so that the mounting portion is able to move along the first direction; clamping portions, movably connected to the mounting portion, and symmetrically arranged along a third direction; and a third driving portion, connected to the mounting portion, and configured to drive the symmetrically arranged clamping portions to approach each other or move away from each other along the third direction. The third direction intersects the first direction.

In the foregoing solution, the third positioning mechanism implements the positioning and clamping of the end plate in the third direction to improve the positioning precision, without causing movement interference between the third positioning mechanism and the first positioning mechanism, the end plate, and the like.

According to an aspect of embodiments of this application, the mounting portion possesses an alignment center line. The alignment center line is located in a middle position between the two clamping portions along the third direction.

In the foregoing solution, the precision of placing the end plate on a mounting platform is ensured, thereby facilitating subsequent assembling of battery modules.

According to another aspect, an embodiment of this application further discloses battery module assembling equipment. The battery module assembling equipment includes the end plate positioning apparatus according to any embodiment of the first aspect described above.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
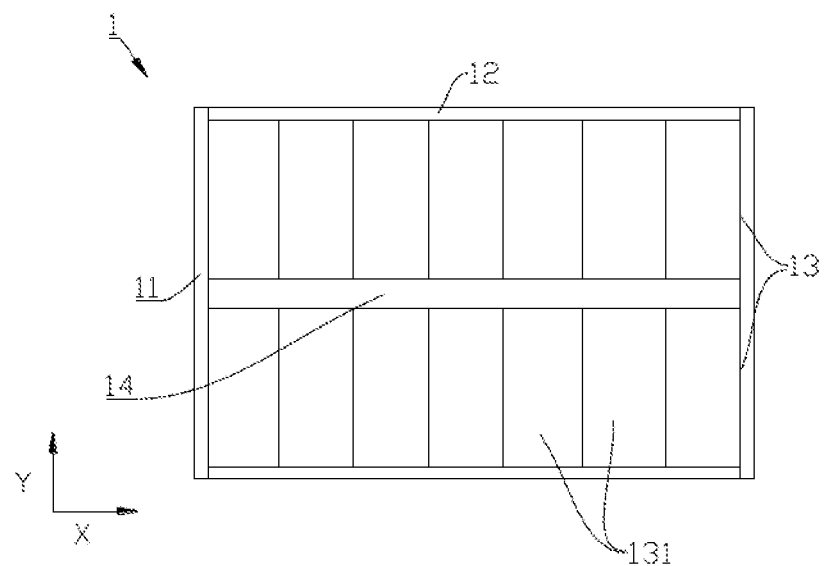
FIG. 1 is a top view of a battery module according to some embodiments of this application.

The drawings are not drawn to scale.

DETAILED DESCRIPTION OF EMBODIMENTS

To make the objectives, technical solutions, and advantages of the embodiments of this application clearer, the following gives a clear description of the technical solutions in the embodiments of this application with reference to the drawings in the embodiments of this application. Evidently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as usually understood by a person skilled in the technical field of this application. The terms used in the specification of this application are merely intended for describing specific embodiments but are not intended to limit this application.

The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

The term "and/or" in this application indicates merely a relation for describing the related items, and represents three possible relationships. For example, "A and/or B" may represent the following three circumstances: A alone, both A and B, and B alone. In addition, the character "/" herein generally indicates an "or" relationship between the item preceding the character and the item following the character.

"A plurality of" referred to in this application means two or more (including two). Similarly. "a plurality of groups" means two or more groups (including two groups).

In this application, the term "parallel" includes not only absolute parallelism, but also approximate parallelism conventionally known in engineering. Similarly, the term "perpendicular" or "vertical" includes not only absolute perpendicularity, but also approximate perpendicularity conventionally known in engineering.

Due to advantages such as a high energy density, a high power density, reusability for many cycles, and a long storage time, battery cells such as a lithium-ion secondary battery cell, a lithium-sulfur battery cell, a sodium-lithium-ion battery cell, a sodium-ion battery cell, or a magnesium-ion battery cell have been widely used in electrical devices in which the battery cells are applicable. For example, the electrical device may be a mobile phone, a portable device, a notebook computer, an electric power cart, an electric vehicle, a ship, a spacecraft, an electric toy, an electric tool, or the like. For example, the spacecraft includes an airplane, a rocket, a space shuttle, a spaceship, and the like. The electric toy includes a fixed or mobile electric toy, such as a game console, an electric car toy, an electric ship toy, an electric airplane toy, and the like. The electric tool includes an electric tool for metal cutting, an electric grinding tool, an electric assembly tool, an electric tool for railways, such as an electric drill, an electric grinder, an electric wrench, an electric screwdriver, an electric hammer, an electric impact drill, a concrete vibrator, and an electric planer.

Understandably, the technical solutions described in embodiments of this application are not only applicable to the devices described above, but also applicable to all devices that use a battery.

To meet different power usage requirements, a plurality of battery cells may be connected in series, parallel, or series-and-parallel pattern to form a battery module, and then a plurality of battery modules may be connected in series, parallel, or series-and-parallel pattern to form a battery. The battery may also be referred to as a battery pack.

FIG. 1 is a top view of a battery module according to some embodiments of this application. As shown in FIG. 1, a direction indicated by the arrow X is a first direction, and a direction indicated by the arrow Y is a third direction. Illustratively, the first direction X is perpendicular to the third direction Y.

In some embodiments, the battery module 1 includes a submodule 13. The submodule 13 includes a plurality of battery cells 131 arranged in sequence along the first direction X. In some embodiments, the battery module 1 includes one submodule 13. In other embodiments, the battery module 1 includes a plurality of submodules 13. The plurality of submodules 13 are arranged along the third direction Y. Each submodule 13 includes a plurality of battery cells 131 arranged in sequence along the first direction X. Illustratively, as shown in FIG. 1, there are two submodules 13.

In some embodiments, the battery module 1 further includes two end plates 11 and two side plates 12. In the first direction X, the plurality of submodules 13 are located between the two end plates 11. In the third direction Y, the plurality of submodules 13 are located between the two side plates 12. Illustratively, the two end plates 11 are connected to the two side plates 12 and form a rectangular frame structure to fix a plurality of submodules 13. In embodiments of this application, a plurality of submodules 13 are integrated in the battery module 1, thereby increasing an energy density of an individual battery module 1.

In some embodiments, the battery module 1 further includes an intermediate partition plate 14. The intermediate partition plate 14 is disposed between adjacent submodules 13. Two ends of the intermediate partition plate 14 are connected to the two end plates 11 respectively. A battery cell is prone to expand during use and thereby apply an expansion force to the end plates 11. By disposing the intermediate partition plate 14, this application can increase the overall strength of the battery module 1, and reduce the risk of detaching the end plates 11 from the side plates 12 under the expansion force.

During assembling of the battery module 1, the inventor of this application fixes one end plate 11 first, and then the fixed end plate 11 is used as a benchmark against which the submodule 13, the side plates 12, and the other end plate 11 are assembled separately. However, the inventor of this application finds that the overall stability of the assembled battery module 1 is inferior due to insufficient positioning precision of the end plate 11 fixed first. Especially, when two or more submodules 13 are assembled to form one battery module 1 to increase the energy density of the battery module 1, the length of the end plate 11 in the third direction Y is increased. This makes it more difficult to fix the end plate 11, and affects the positioning precision of the end plate 11. In the related art known to the inventor of this application, no structure for positioning the end plate 11 is disposed in the battery module assembling equipment.

In view of this, this application provides an end plate positioning apparatus and battery module assembling equipment to bring the end plate 11 into position during the assembling of the battery module 1, thereby improving the positioning precision during the assembling of the battery module 1.

An embodiment of this application provides battery module assembling equipment, including an end plate positioning apparatus. The end plate positioning apparatus is located on a side of a battery module assembling platform of the battery module assembling equipment along the first direction X. During the assembling the battery module 1, one end plate 11 is positioned by the end plate positioning apparatus first, and then this end plate 11 is used as a benchmark against which a plurality of submodules 13, an intermediate partition plate 14, side plates 12, the other end plate 11, and the like are assembled on the battery module assembling platform. After the step of fixing by welding, a desired battery module 1 with a high energy density is obtained.

During the assembling of the battery module 1, the end plate 11 is positioned by the end plate positioning apparatus to ensure that the end plate 11 is positioned at a relatively high precision. The end plate positioning apparatus is adaptable to the positioning of end plates 11 of different lengths, so as to meet the requirement of assembling different numbers of submodules 13 into one battery module 1, and increase the energy density of the battery module 1. The end plate positioning apparatus is described in detail below using an example of a battery module 1 that contains two submodules 13.

Figure 2:
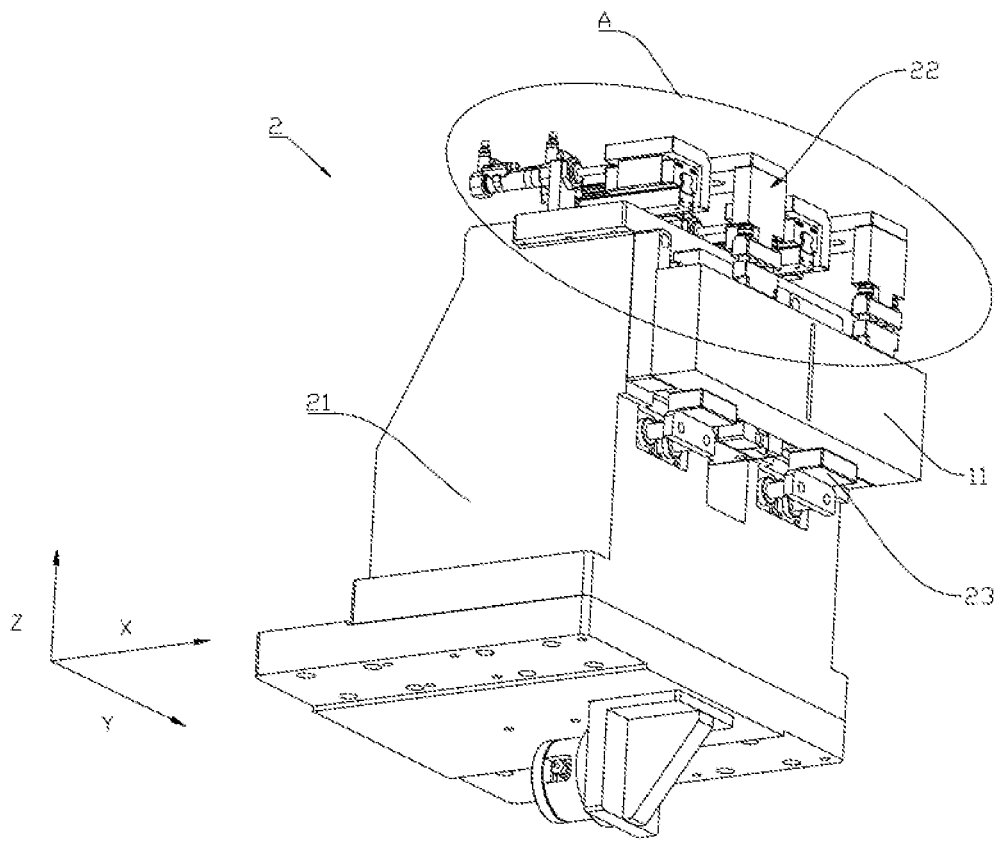
FIG. 2 is a schematic structural diagram of an end plate positioning apparatus according to some embodiments of this application.

FIG. 2 is a schematic structural diagram of an end plate positioning apparatus according to some embodiments of this application. As shown in FIG. 2, a direction indicated by the arrow X is a first direction, a direction indicated by the arrow Y is a third direction, and a direction indicated by the arrow Z is a second direction. Illustratively, the first direction X, the second direction Z, and the third direction Y are perpendicular to one other.

An embodiment of this application provides an end plate positioning apparatus. The end plate positioning apparatus 2 includes a pedestal 21 and a supporting piece 23. The pedestal 21 is configured to connect the end plate positioning apparatus 2 into the battery module assembling equipment. The supporting piece 23 is disposed on the pedestal 21, and the supporting piece 23 is configured to hold the end plate 11. The end plate positioning apparatus 2 includes a positioning mechanism 22. The positioning mechanism 22 is connected to the pedestal 21.

The supporting piece 23 includes a supporting platform. The supporting platform is kept flush with the battery module assembling platform. During the assembling, a robotic arm grabs an end plate 11 and places it on the supporting platform, and then the robotic arm releases the end plate 11. To ensure the precision and stability of the position of the end plate 11 on the supporting platform, and make the end plate 11 competent as a benchmark against which the battery module is assembled. The positioning mechanism 22 moves to position the end plate 11 at the same time that the robotic arm places the end plate 11 onto the supporting platform. The positioning mechanism 22 disposed can improve the positioning precision of the end plate 11 to ensure a desirable assembling effect of the battery module. After the end plate 11 is brought into position, the position needs to be maintained until completion of assembling one battery module, during which the positioning mechanism 22 needs to be prevented from interfering with other components. The specific structure of the positioning mechanism 22 is described in detail below.

Figure 3:
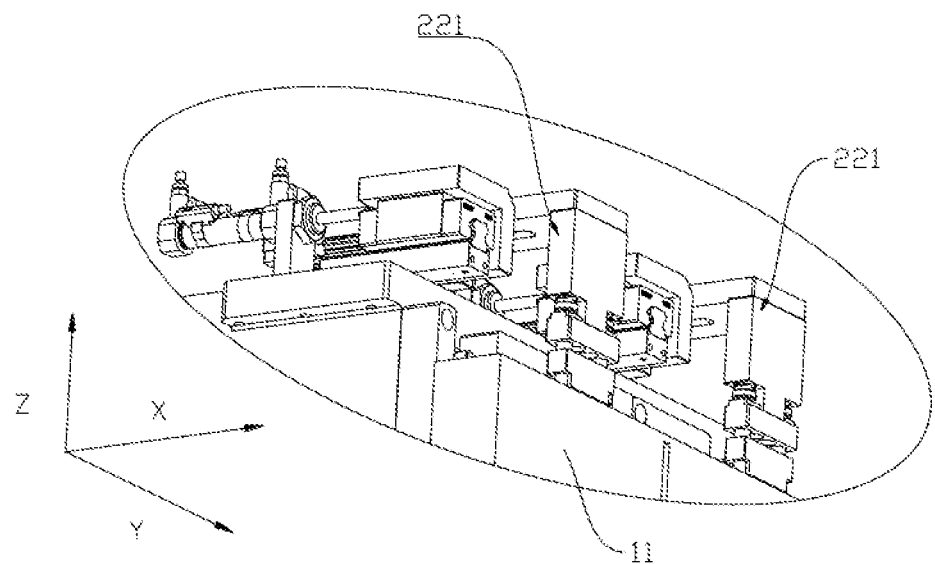
FIG. 3 is a close-up view of a part A shown in FIG. 2.

In some specific embodiments, as shown in FIG. 3, the end plate positioning apparatus includes at least one first positioning mechanism 221. The first positioning mechanism 221 is configured to position the end plate 11 in the second direction Z. In the second direction Z, the end plate 11 is confined to a space between the first positioning mechanism 221 and the supporting platform.

In some embodiments, a plurality of first positioning mechanisms 221 are spaced out along the third direction Y, so that the first positioning mechanisms 221 are configured to position the end plates 11 of different lengths in the height direction. The plurality of first positioning mechanisms 221 can avoid a problem that the end plate 11 is prone to be offset along the second direction Z due to a considerable length. Illustratively, there are two first positioning mechanisms 221, and the spacing between the two first positioning mechanisms 221 spaced apart is adjustable depending on the specific length of the partition plate, without being specifically limited herein. In some embodiments, the second direction Z is parallel to the height direction.

In some embodiments, the first positioning mechanisms 221 and the supporting pieces 22 are identical in number and disposed in a one-to-one correspondence. When the end plate 11 is positioned between the first positioning mechanisms 221 and the supporting pieces 23 along the second direction Z, the one-to-one correspondence between the first positioning mechanisms 221 and the supporting pieces 23 achieves an effect that the end plate 11 is uniformly stressed everywhere in the length direction in the third direction Y, thereby avoiding deformation caused by a local overstress of the end plate 11, and improving stability of positioning the end plate 11.

Figure 4:
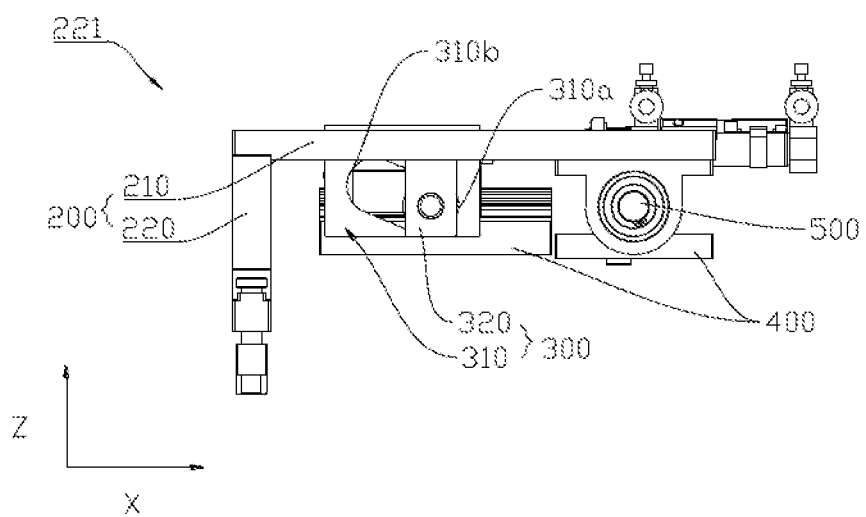
FIG. 4 is a front view of an end plate positioning apparatus in which a first positioning mechanism is located in a first position according to some embodiments of this application.
Figure 5:
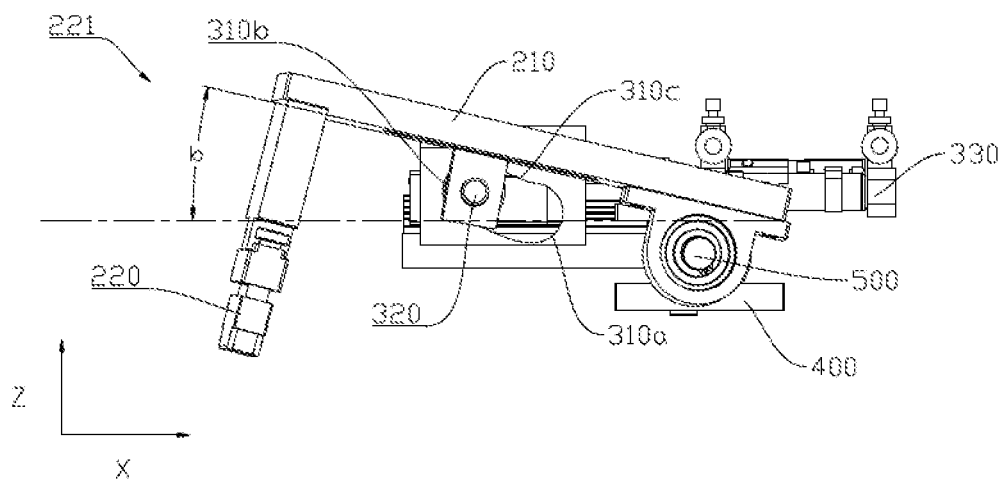
FIG. 5 is a front view of an end plate positioning apparatus in which a first positioning mechanism is located in a second position according to some embodiments of this application.
Figure 6:
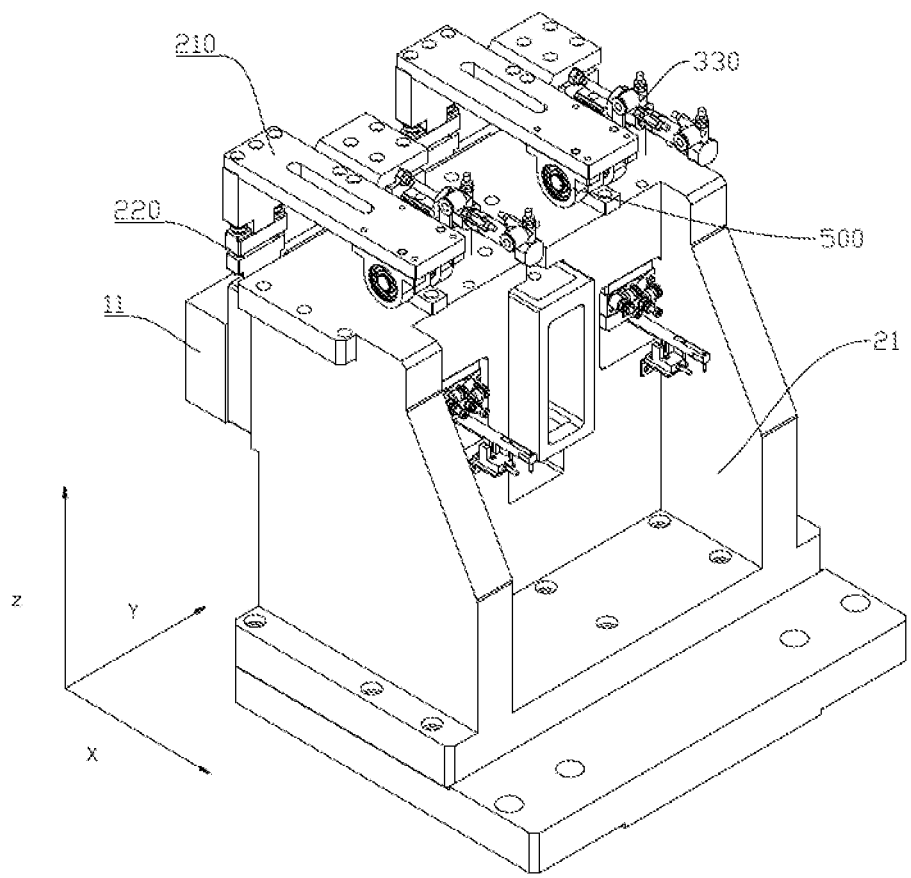
FIG. 6 is a schematic structural diagram of an end plate positioning apparatus when a first positioning mechanism brings an end plate into position according to some embodiments of this application.

As shown in FIG. 4, FIG. 5, and FIG. 6, the first positioning mechanism 221 includes a first positioning piece 200 and a positioning locking piece 300, and the first positioning piece 200 is rotatably connected to the pedestal 21. Illustratively, the pedestal 21 contains a fixing plate 400. The first positioning piece 200 is rotatably connected to the fixing plate 400.

The positioning locking piece 300 includes a guide portion 310 and a slide portion 320. One of the guide portion 310 or the slide portion 320 is disposed on the first positioning piece 200, and the other is disposed on the pedestal 21. In some examples, the guide portion 310 is disposed on the fixing plate 400, and the fixing plate 400 can connect the guide portion 310 to the pedestal 21.

The guide portion 310 includes a first position 310*a* and a second position 310*b*. The slide portion 320 can move between the first position 310*a* and the second position 310*b* to drive the first positioning piece 200 to rotate. When the slide portion 320 is located in the first position 310*a*, the first positioning piece 200 is in abutment with the end plate 11, so that the first positioning piece 200 and the supporting piece clamp the end plate 11 from both sides of the second direction Z. When the slide portion 320 is located in the second position 310*b*, the first positioning piece 200 is out of abutment with the end plate 11. In an initial state, the slide portion 320 stays in the second position 310*b*. After the end plate 11 is grabbed and placed onto the supporting platform by the robotic arm, the positioning locking piece 300 can unlock the first positioning piece 200, so that a relative movement occurs between the guide portion 310 and the slide portion 320. The slide portion 320 moves from the first position 310*a* to the second position 310*b*, and drives the first positioning piece 200 to move to abut on the surface of the end plate 11 on a side away from the supporting platform, and stay in the abutment state. In the foregoing arrangement, the slide portion 320 is driven to change over between the first position 310*a* and the second position 310*b* so that the first positioning piece 200 is driven to rotate until the first positioning piece is in abutment with or out of abutment with the end plate 11 and stays in the corresponding position. By virtue of such arrangement, after the end plate 11 is placed onto the supporting platform, the first positioning piece 200 brings the end plate 11 into position steadily and precisely, thereby avoiding decrease in the positioning precision of the end plate 11 caused by an impact on the end plate positioning apparatus during the assembling, and in turn, improving the assembling precision of the battery module.

In addition, during positioning of the end plate 11, the first positioning mechanism 221 drives the slide portion 320 to change over between the first position 310a and the second position 310b to drive the first positioning piece 200 to rotate, so as to bring the end plate 11 into position or out of position. This arrangement, on the one hand, can avoid interference between the end plate 11 and the first positioning mechanism 221 when the robotic arm grabs and moves the end plate 11, so as to facilitate the grab and placement of the end plate 11. On the other hand, the design of the first positioning mechanism 221 can convert rotation into a movement in the second direction Z to implement positioning of the end plate 11, without occupying much space in the second direction Z. In this way, the end plate positioning apparatus achieves the purpose of positioning the end plate 11 in the limited space of the battery module assembling equipment, and implements positioning of the end plate 11 in the height direction by fully utilizing the limited space in the second direction Z, thereby avoiding the problem that the end plate 11 is prone to be out of position in the height direction due to a considerable length of the placed end plate 11, and improving the positioning precision of the end plate 11.

In some specific embodiments, the first positioning piece 200 includes a connecting rod 210 and a hold-down bar 220. One end of the connecting rod 210 is rotatably connected to the pedestal 21, and the other end is connected to the hold-down bar 220. A supporting piece is disposed on the sidewall of the pedestal 21 in the first direction X, so that a least a part of the pedestal 21 is higher than the supporting platform. The connecting rod 210 is connected to the pedestal 21 at a position higher than the supporting platform. At least the part of the connecting rod 210, at which the hold-down bar 220 is disposed, protrudes out of the pedestal 21 and is located above the supporting platform. In some examples, the connecting rod 210 is rotatably connected to the pedestal 21 through a spindle 500, so that the connecting rod 210 can drive the hold-down bar 220 to rotate relative to the pedestal 21 to approach or move away from the end plate 11. The slide portion 320 is connected to the connecting rod 210, the guide portion 310 is movably connected to the pedestal 21, and both are located in a position close to the spindle 500 on the pedestal 21, so that the guide portion 310 can move relative to the pedestal 21 along the first direction X, and drive the slide portion 320, which fits with the guide portion, to change over between the first position 310a and the second position 310b. When the slide portion 320 is located in the first position 310a, the length direction of the connecting rod 210 is parallel to the first direction X, the hold-down bar 220 is in abutment with the end plate 11 along the second direction Z, and the first direction X intersects the second direction Z. When the slide portion 320 is located in the second position 310b, the length direction of the connecting rod 210 is at a preset angle b to the first direction X.

It is hereby noted that, when the end plate 11 is positioned by controlling the rotation of the connecting rod 210 through the fit between the slide portion 320 and the guide portion 310, the length of the hold-down bar 220 needs to be designed beforehand according to the height of the end plate 11 placed on the supporting platform. In this way, when the length direction of the connecting rod 210 is parallel to the first direction X, the length direction of the hold-down bar 220 is parallel to the second direction Z, and the surface of the hold-down bar 220 is in abutment with the end plate 11. When the end plate 11 needs to be placed on the supporting platform, the preset angle b by which the connecting rod 210 rotates relative to the pedestal 21 is adjustable depending on the actual situation. To be specific, after the end plate 11 is placed on the supporting platform, the limited space reserved above allows the connecting rod 210 to rotate upward from the first direction X by an angle falling within a maximum angle range. The preset angle b is adaptively adjustable within the allowable maximum angle range depending on actual situations, without being limited herein.

In a case that the preset angle b of rotation of the connecting rod 210 is adjusted by controlling the changeover of the slide portion 320 between the first position 310a and the second position 310b, a central connecting line between the first position 310a and the second position 310b is at an angle to the first direction X when the connecting rod 210 is parallel to the first direction X, and this angle needs to be equal to the preset angle b in order to ensure the positioning precision of the end plate 11 and improve accuracy of control of the preset angle b of rotation of the connecting rod 210. When the slide portion 320 moves from the first position 310a to the second position 310b, the central connecting line between the first position 310a and the second position 310b is parallel to the length direction of the connecting rod 210. In this case, as long as the slide portion 320 is controlled to change over between the first position 310a and the second position 310b, the end plate 11 can be automatically brought into position and out of position at a relatively high precision, thereby reducing the positioning error caused by repeated changeover.

Optionally, the slide portion 320 may be in diversified structural fit with the guide portion 310. For example, the guide portion 310 includes a guide slot, the slide portion 320 includes a bulge extending into the guide slot, and the bulge is slidably connected to the guide slot. With the bulge and the guide slot so disposed, the bulge is slidably connected into the guide slot, and can move to the first position 310a or second position 310b along a track of the guide slot. The simple structural fit facilitates the changeover of the slide portion 320 between the first position 310a and the second position 310b, thereby facilitating assembling. In addition, the fit between the bulge and the guide slot provides a guiding effect for the rotation of the connecting rod 210 relative to the pedestal 21, thereby ensuring proper positioning of the end plate 11 in the height direction.

Illustratively, the guide slot includes at least a first hole and a second hole that communicate with each other. A connecting line of an axis of the first hole and an axis of the second hole is at a preset angle b to the first direction X. The length direction of the connecting rod 210 is parallel to the first direction X when the bulge is located in the first hole, and the length direction of the connecting rod 210 is at the preset angle b to the first direction X when the bulge slides to the second hole. The guide slot further includes a communicating channel 310c. The communicating channel 310c implements communication between the first hole and the second hole. After being connected to the guide slot, the bulge can change over positions between the first hole and the second hole through the communicating channel 310c. When the bulge is located in the first hole, at least a part of the bulge abuts on the sidewall defined by the first hole. The sidewall defined by the first hole restricts the bulge from further moving away from the second hole, so that the hold-down bar 220 keeps in abutment with the end plate 11. When the positioning is completed or when the end plate 11 is initially positioned, the bulge needs to be controlled to move to the second hole along the communicating channel 310c until at least a part of the bulge abuts on the sidewall defined by the second hole. The sidewall defined by the second hole restricts the bulge from further moving away from the first hole, so that the hold-down bar 220 keeps out of abutment with the end plate 11. This also avoids collision between the end plate 11 and the hold-down bar 220 during the movement, and avoids mutual interference. In this way, the preset angle b by which the connecting rod 210 is rotated can be adjusted through the fit between the bulge and the first hole or second hole. This adjustment manner can control the connecting rod 210 at a relatively high precision to rotate by an angle that changes over between an initial 0-degree angle and the preset angle b, so as to ensure that the hold-down bar 220 can implement efficient and quick positioning in the height direction on each occasion of positioning the end plate 11.

Understandably, among the first hole and the second hole that communicate with each other, the first hole and the second hole may be through-holes or blind holes. In this way, both holes can be in clearance fit with the bulge. In addition, this enables the bulge to change over positions between the first hole and the second hole through the communicating channel 310c between the first hole and the second hole. The diameter of the bulge is at equal distances to the two sidewalls of the communicating channel 310c, so as to ensure the stability of movement of the bulge in the guide slot and implement self-locking, and in turn, improve the stability of positioning the end plate 11 in the second direction Z. The specific form of the first hole and the second hole is not specifically limited herein, for example, whether the holes are through-hole or blind holes, whether the hole wall is smooth or contains fitting bulges and recesses for a purpose of guiding, and whether the shape of the holes is circular or elliptical.

Illustratively, both the first hole and the second hole are circular through-holes, and the preset angle b is set to one of 15°, 30°, or 45°. In this case, the two sidewalls of the communicating channel 310c are tangent to the first hole and the second hole respectively. The smooth transition connection between the three components facilitates the bulge to change over positions between the first hole and the second hole, and improves the smoothness of the changeover.

In some embodiments, in order to enable the slide portion 320 to slide in the guide portion 310 to change over between the first position 310a and the second position 310b, the positioning locking piece 300 further includes a first driving portion 330. The first driving portion 330 is connected to the pedestal 21, and is configured to drive the guide portion 310 to move along the first direction X.

Illustratively, the first driving portion 330 may be a driving cylinder. When the slide portion 320 is located in the first position 310a of the guide portion 310, the first hole is located above the second hole, the length direction of the connecting rod 210 is parallel to the first direction X, and the hold-down bar 220 abuts on the end plate 11. When the hold-down bar 220 needs to be out of abutment with the end plate 11, the first driving portion 330 is driven to move, so that the guide portion 310 is driven to move in the first direction X toward a side away from the second hole. In this way, the connecting rod 210 rotates by the preset angle b at the same time that the slide portion 320 on the connecting rod 210 moves to the second position 310b along the communicating 310c, thereby making the hold-down bar 220 be out of abutment with the end plate 11. The movement in the first direction X is converted into a desired movement in the second direction Z by the fit between the first driving portion 330, the slide portion 320, and the guide portion 310 that are disposed, thereby implementing stable positioning of the end plate 11 at a high precision on the basis of reducing the occupation of space in the second direction Z.

Figure 7:
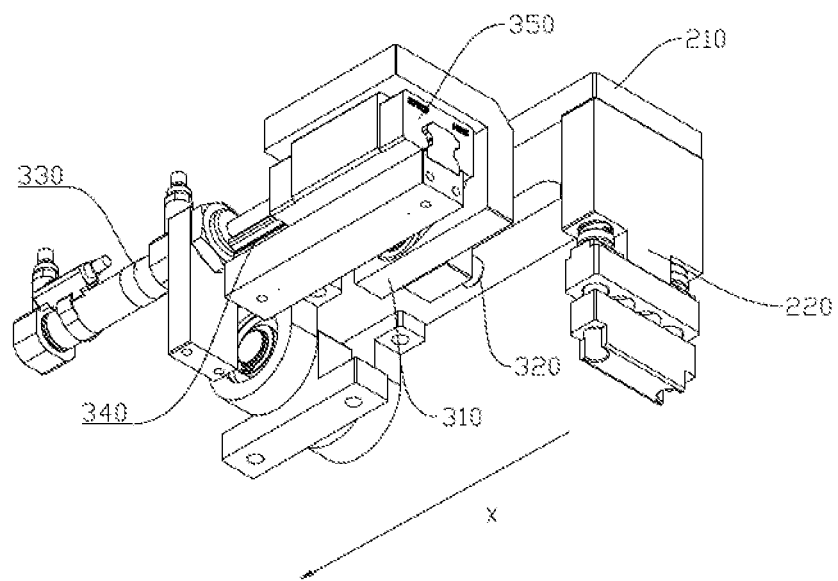
FIG. 7 is an overall schematic structural diagram of a first positioning mechanism in an end plate positioning apparatus according to some embodiments of this application.

Optionally, as shown in FIG. 7, in order to ensure a relatively high precision for the first driving portion 330 to drive the guide portion to move along the first direction, a guide rail 340 and a slide block 350 that fit with each other are disposed on the guide portion and the pedestal respectively. The slide block 350 is connected to a driving plunger rod of the first driving portion 330. The slide block 350 is fixedly connected to the guide portion 310 to drive the guide portion 310 to move along the first direction X, thereby driving the slide portion 320 in fit with the guide portion 310 to move along the track of the guide slot in the guide portion 310. The fit between the guide rail 340 and the slide block 350 is designed to provide a guiding function for the first driving portion 330 to drive the guide portion 310 to move along the first direction X.

Figure 8:
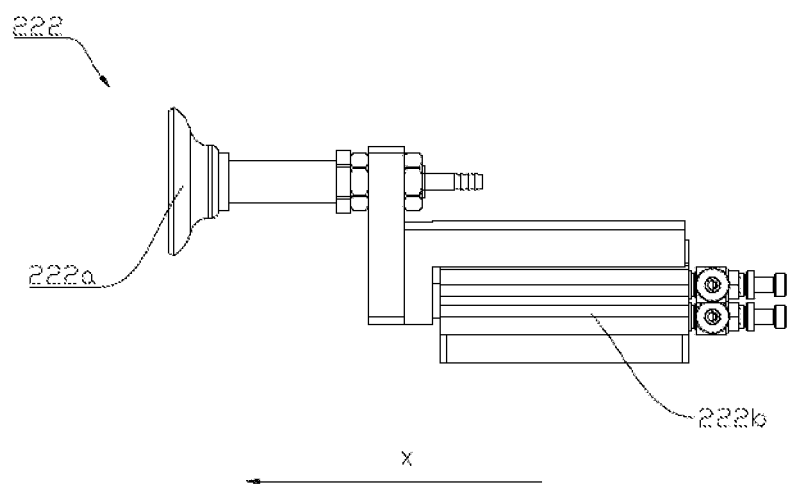
FIG. 8 is a schematic structural diagram of a second positioning mechanism in an end plate positioning apparatus according to some embodiments of this application.

In some specific embodiments, as shown in FIG. 8, the end plate positioning apparatus further includes a second positioning mechanism 222. The second positioning mechanism 222 is configured to position the end plate in the first direction X. The second positioning mechanism 222 includes a suction cup 222a and a second driving portion 222b. The suction cup 222a is movably connected to the pedestal. The suction cup 222a contains a suction end face configured to attract the end plate. The second driving portion 222b is connected to the pedestal, and configured to drive the suction cup 222a to draw the end plate to approach or move away from the pedestal. During placement of the end plate on the supporting platform, the second positioning mechanism 222 disposed can draw the end plate into position before the robotic arm gives up grabbing the end plate, and prevent the end plate from tipping over before the first positioning mechanism starts to function.

In addition, the second positioning mechanism 222 disposed makes it unnecessary for the robotic arm to place the end plate on the supporting platform in such a position that the hold-down bar can abut on the end plate, thereby reducing the difficulty of placing the end plate by the robotic arm, and preventing the robotic arm or the end plate from colliding with the first positioning mechanism. When the robotic arm places the end plate onto the battery module assembling platform, the second driving portion 222b can drive the suction cup 222a to move away from the pedestal and close to the placed end plate along the first direction X. After the suction cup 222a attracts the surface of the end plate to fix the end plate, the second driving portion 222b drives the suction cup 222a to move in an opposite direction, so as to drive the end plate to move toward the pedestal. In this way, the end plate is finally located on the supporting platform in a position from which the end plate can fit with the first positioning mechanism. On the one hand, by attracting the end plate, the suction cup 222a is adaptable to end plates of different dimensions, and helps to position the end plate without impairing the integrity of the end plate. On the other hand, the manner in which the second driving portion 222b drives the suction cup 222a to move provides adaptability for the robotic arm to place the end plate in different positions of the supporting platform or the battery module assembling platform, so as to implement positioning of the end plate in the first direction X. In addition, with the suction cup 222a being movable, the robotic arm does not have to place the end plate beforehand in a position reachable to the first positioning mechanism. Instead, the suction cup 222a draws the end plate to move to the corresponding position, thereby avoiding interference with the first positioning mechanism during the placement of the end plate onto the supporting platform, and reducing the difficulty of placing the end plate.

Figure 9:
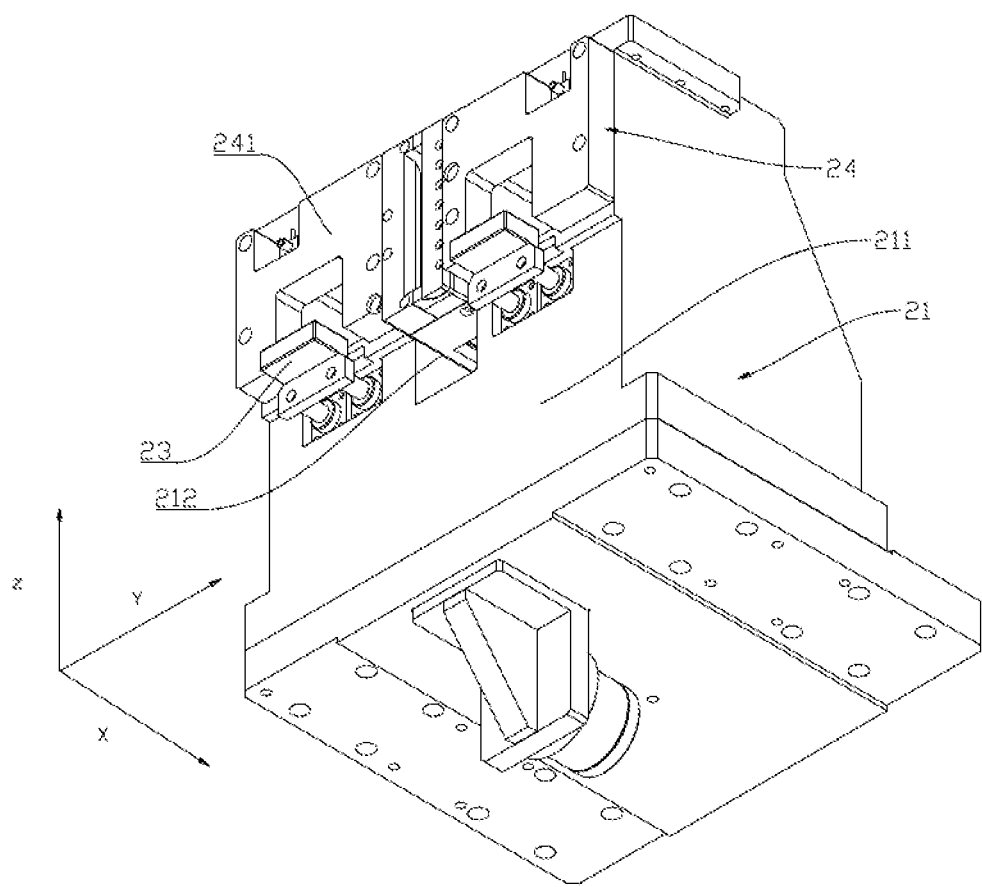
FIG. 9 is a schematic structural diagram of a pedestal in an end plate positioning apparatus according to some embodiments of this application.

Illustratively, as shown in FIG. 8 and FIG. 9, the pedestal 21 contains a first sidewall 211. The first sidewall 211 is located in the first direction X on a side used for holding the end plate. The supporting piece 23 is detachably connected to the first sidewall 211. An abutting piece 24 is disposed above the supporting piece 23 on the first sidewall 211. The end plate 21 is in contact and fit with the abutting piece 24 when the suction cup 222a draws the end plate to approach the pedestal 21. Specifically, the abutting piece 24 contains an abutting face 241. The abutting face 241 protrudes out of the first sidewall 211 toward the supporting piece 23 in the first direction X. The pedestal 21 contains a recessed position 212. At least a part of the second positioning mechanism 222 is located in the recessed position 212. In this way, during positioning of the end plate, the suction cup 222a can penetrate above the supporting platform to attract the end plate located on the battery module assembling platform, and drive the end plate to move in a direction toward the pedestal 21 along the supporting platform until the surface of the end plate fits closely with the abutting face 241. At this time, the end plate is not only positioned in the first direction X by the second positioning mechanism 222, but also moved to a position from which the first positioning mechanism can implement positioning of the end plate, thereby avoiding the collision caused by direct placement of the end plate onto the supporting platform, and improving the stability and precision of positioning.

Optionally, the abutting piece 24 may be a metal part capable of heat dissipation, such as a copper sheet. This provides a high heat dissipation capability during the assembling of the battery module, and avoids safety performance problems of the battery module caused by a heat dissipation failure due to the close fitting between the end plate and the abutting piece 24 during welding.

Figure 10:
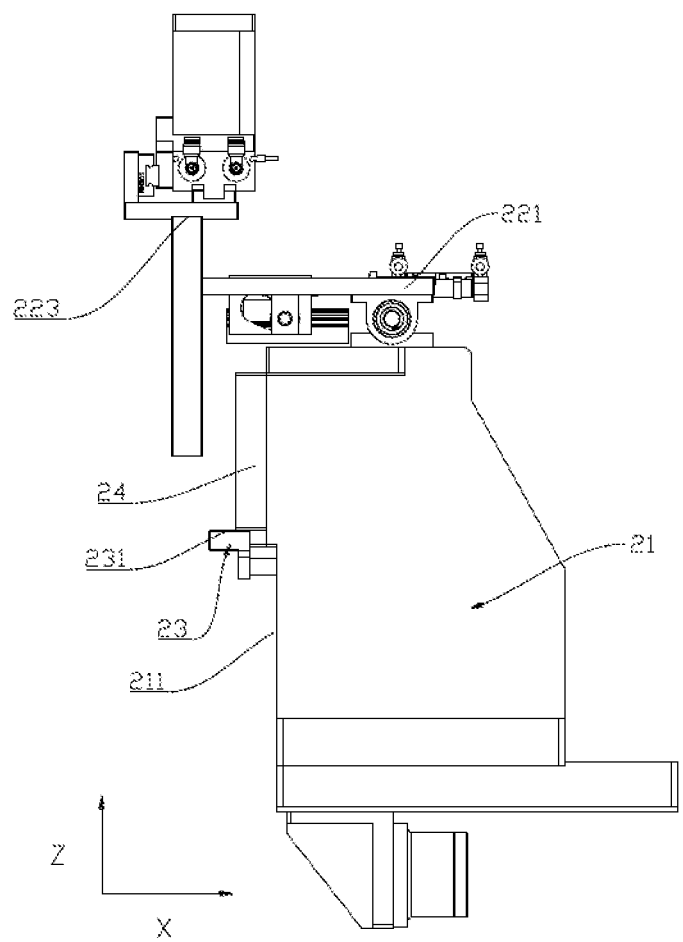
FIG. 10 is a schematic structural diagram of another end plate positioning apparatus according to some embodiments of this application.
Figure 11:
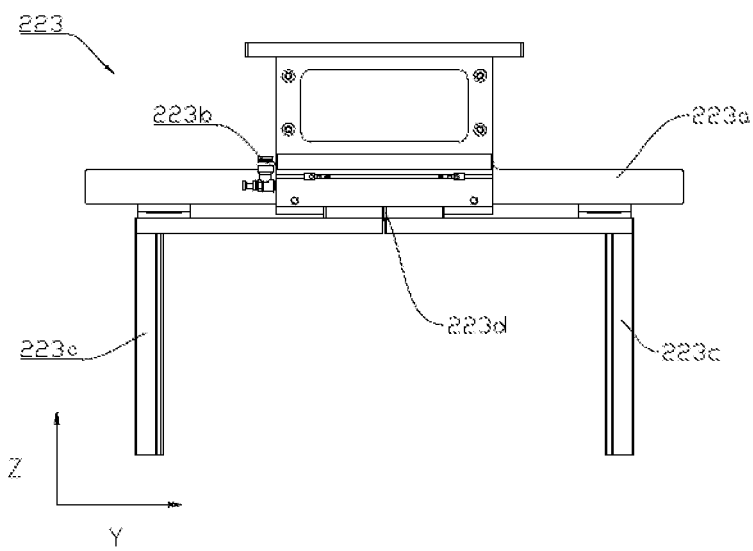
FIG. 11 is a schematic structural diagram of a third positioning mechanism in an end plate positioning apparatus according to some embodiments of this application.

In some specific embodiments, as shown in FIG. 10 and FIG. 11, the end plate positioning apparatus further includes a third positioning mechanism 223. The third positioning mechanism 223 can move relative to the pedestal 21 along the first direction X. The third positioning mechanism 223 includes a mounting portion 223a movably connected to the pedestal 21, so that the mounting portion 223a can move along the first direction X. Illustratively, the first positioning mechanism 221 and the third positioning mechanism 223 are connected to the battery module assembling equipment separately. The first positioning mechanism 221 is fixedly connected, and the third positioning mechanism 223 is slidably connected, to the battery module assembling equipment, so that the third positioning mechanism 223 can move relative to the pedestal 21 along the first direction X. A clamping portions 223c are movably connected to the mounting portion 223a. The clamping portions 223c are symmetrically arranged along the third direction Y, and are located on two sides of the pedestal 21 in the third direction Y respectively. In some examples, a third driving portion 223b is disposed on the mounting portion 223a. The third driving portion 223b is configured to drive the two symmetrically arranged clamping portions 223c to approach each other or move away from each other along the third direction Y, where the third direction Y intersects the first direction X. When the positioning of the end plate in the third direction Y is not underway, the third positioning mechanism 223 is located on a side of the pedestal 21 away from the supporting platform 231 in the first direction, so as to avoid interference between the third positioning mechanism 223, the first positioning mechanism 221, and the end plate. After the end plate is positioned by the first positioning mechanism 221 and the second positioning mechanism, the end plate abuts on the abutting piece 24. The mounting portion 223a drives the clamping portions 223c to move along the first direction X to a position corresponding to the end plate. In this way, the two clamping portions 223c are located on the same straight line in the third direction Z and the length direction of the end plate 11, and the two clamping portions 223c are located on two opposite sides of the end plate 11. The third driving portion 223b controls the two clamping portions 223c to approach each other. In this way, the clamping faces of the clamping portions 223c abut on the surface of the end plate to implement clamping and positioning of the end plate in the third direction Z, thereby further improving the positioning precision of the end plate.

Illustratively, the mounting portion 223a possesses an alignment center line 223d. The alignment center line 223d is located in a middle position between the two clamping portions 223c along the third direction Y. With the alignment center line 223d disposed, during arrangement of the third positioning mechanism 223, the alignment center line 223d is controlled to be aligned with a preset end plate position center line on the pedestal 21 first. In this way, during positioning of the end plate, when the clamping portions 223c implement clamping and positioning of the end plate 11 in the third direction Y, the alignment center line 223d can be located at the center of the end plate 11 in the third direction Y thereby ensuring a high precision of the position of the end plate on the supporting platform 231 and facilitating subsequent assembling and formation of the battery module.

Although this application has been described with reference to exemplary embodiments, various improvements may be made to the embodiments without departing from the scope of this application, and the components of this application may be replaced with equivalents. Particularly, to the extent that no structural conflict exists, various technical features mentioned in various embodiments may be combined in any manner. This application is not limited to the specific embodiments disclosed herein, but includes all technical solutions falling within the scope of the claims.

What is claimed is:

1. An end plate positioning apparatus, applicable to assembling of battery modules, comprising:
  a pedestal;
  a supporting piece, disposed on the pedestal and configured to hold an end plate;
  at least one first positioning mechanism, comprising a first positioning piece and a positioning locking piece, wherein the first positioning piece is rotatably connected to the pedestal, the positioning locking piece comprises a guide portion and a slide portion, one of the guide portion or the slide portion is disposed on the first positioning piece, and the other is disposed on the pedestal; the guide portion comprises a first position and a second position, and the slide portion is able to move between the first position and the second position to drive the first positioning piece to rotate; when the slide portion is located in the first position, the first positioning piece is in abutment with the end plate, so that the first positioning piece and the supporting piece clamp the end plate from both sides; and, when the slide portion is located in the second position, the first positioning piece is out of abutment with the end plate.

2. The end plate positioning apparatus according to claim 1, wherein the first positioning piece comprises a connecting rod and a hold-down bar, one end of the connecting rod is rotatably connected to the pedestal, and the other end is connected to the hold-down bar; and the slide portion is connected to the connecting rod, the guide portion is movably connected to the pedestal, and the guide portion is able to move relative to the pedestal along a first direction so that, when the slide portion is located in the first position, a length direction of the connecting rod is parallel to the first direction, the hold-down bar is in abutment with the end plate along a second direction, and the first direction intersects the second direction, and so that, when the slide portion is located in the second position, the length direction of the connecting rod is at a preset angle to the first direction.

3. The end plate positioning apparatus according to claim 1, wherein the guide portion comprises a guide slot, the slide portion comprises a bulge extending into the guide slot, and the bulge is slidably connected to the guide slot.

4. The end plate positioning apparatus according to claim 3, wherein the guide slot comprises at least a first hole and a second hole that communicate with each other, and a connecting line of an axis of the first hole and an axis of the second hole is at a preset angle to the first direction; and the length direction of the connecting rod is parallel to the first direction when the bulge is located in the first hole, and the length direction of the connecting rod is at the preset angle to the first direction when the bulge slides to the second hole.

5. The end plate positioning apparatus according to claim 4, wherein the first hole and the second hole are through-holes, or, the first hole and the second hole are blind holes.

6. The end plate positioning apparatus according to claim 2, wherein the positioning locking piece further comprises a first driving portion, and the first driving portion is connected to the pedestal and is configured to drive the guide portion to move along the first direction.

7. The end plate positioning apparatus according to claim 1, wherein the end plate positioning apparatus further comprises a second positioning mechanism, and the second positioning mechanism comprises:

a suction cup, movably connected to a side of the pedestal toward the end plate, wherein the suction cup contains a suction end face configured to attract the end plate; and a second driving portion, connected to the pedestal, and configured to drive the suction cup to draw the end plate to approach or move away from the pedestal.

8. The end plate positioning apparatus according to claim 7, wherein the pedestal contains a first sidewall, the supporting piece is detachably connected to the first sidewall, an abutting piece is disposed above the supporting piece on the first sidewall, and the end plate is in contact and fit with the abutting piece when the suction cup draws the end plate to approach the pedestal.

9. The end plate positioning apparatus according to claim 2, wherein the end plate positioning apparatus further comprises a third positioning mechanism, the third positioning mechanism is able to move relative to the pedestal along the first direction, and the third positioning mechanism comprises:

a mounting portion, movably connected to the pedestal so that the mounting portion is able to move along the first direction;

clamping portions, movably connected to the mounting portion, and symmetrically arranged along a third direction; and a third driving portion, connected to the mounting portion, and configured to drive the symmetrically arranged clamping portions to approach each other or move away from each other along the third direction, wherein the third direction intersects the first direction.

10. The end plate positioning apparatus according to claim 9, wherein the mounting portion possesses an alignment center line, and the alignment center line is located in a middle position between the two clamping portions along the third direction.

11. Battery module assembling equipment, comprising the end plate positioning apparatus according to claim 1.

* * * * *